March 21, 1939.  J. S. KIMBLE ET AL  2,151,476

MOLDING METHOD

Filed March 23, 1936

INVENTORS.
John S. Kimble & Spencer E. Palmer
BY
ATTORNEYS

Patented Mar. 21, 1939

2,151,476

UNITED STATES PATENT OFFICE 2,151,476

MOLDING METHOD

John S. Kimble and Spencer E. Palmer, Kingsport, Tenn., assignors, by mesne assignments, to Eastman Kodak Company, Jersey City, N. J., a corporation of New Jersey Application March 23, 1936, Serial No. 70,200

2 Claims. (Cl. 18—55)

This invention relates to the art of molding, shaping, or forming of plastic products and more particularly to a method of molding cellulose organic acid ester compositions, such as those composed of cellulose acetate, cellulose acetate propionate and the like.

In the manufacture of cellulose derivative plastic products, it has been the practice to employ processes which require a relatively high degree of heat, either for the original incorporation of the plasticizer into the cellulose derivative material, or during the actual molding operation or both during incorporation and molding. For example, in the preparation of the plastic material it is customary to grind the cellulose derivative together with a plasticizer in a ball mill or to subject it to mechanical mixing at ordinary or slightly elevated temperatures and then to subject the partially plasticized mass to kneading or rolling on heated rolls to complete the plasticizing of the mass, and finally to mold the product of rolling or kneading at elevated or fairly elevated temperatures, either by the open, injection, or extrusion molding methods. Among others, this method of working has two serious drawbacks. First, it requires a kneading or rolling operation to complete the incorporation of the plasticizer and, second, it involves the use of temperatures in the rolling or kneading and in the molding step which are often equal to or above the decomposition temperature of the cellulose derivative.

Until the advent of the present invention, so far as we are aware, it has never been thought possible definitely to keep the temperature of the incorporating step sufficiently low without an undue sacrifice in the effectiveness of plasticization or without too great a sacrifice in the fluidity of the molding mass or in the quality of the finished product. In fact, in some types of molding processes, such as injection molding, a high degree of fluidity or flowability is essential for any practical operation and a substantial lowering of the temperature has heretofore generally been considered out of the question. In order to obtain plasticity at moderate temperatures it has been proposed to employ plasticizers having a more drastic solvent or plasticizing action on the cellulose derivative material, but when these plasticizers are employed in accordance with the customary practice, that is, by mixing at ordinary or moderately elevated temperatures it is found that their solvent action on the material is too drastic. Any pronounced local solvent action on the plastic particles results in a spotty, blotchy, uneven type of molded product. Moreover, once the plasticizer has acted in this manner no amount of subsequent heating or mechanical treatment will serve to homogenize the material.

It is an object of the present invention to provide a simple, effective, and economical method for the conversion of a cellulose organic acid ester material into a molded or extruded plastic of complete homogeneity and possessing other desired properties. A further object is to provide a method for the conversion of cellulose organic acid ester material, such as cellulose acetate, cellulose acetate propionate and the like, into a homogeneously plasticized product without the use of heated rolls or the use of disadvantageously high temperature treatment. A still further object is to simplify existing molding practice and to provide a method for obtaining various types of homogeneously and uniformly plasticized sheets, tubes, rods, and the like. Another object is to provide a method of extrusion molding of cellulose organic acid ester material wherein the extruding operation may be successfully carried out at temperatures which are definitely below the decomposition point of the ester. Other objects will appear hereinafter.

The objects are accomplished by the following invention which in its broader aspects, comprises the combination of two principal steps, namely, the incorporation into a cellulose organic acid ester material, typified by cellulose acetate, of a solvent plasticizer therefor at a temperature below that at which the plasticizer attacks the ester, that is, has an appreciable local solvent action thereon, and then the direct molding, as by extrusion, of the plasticized material under the influence of heat and pressure, but at a temperature below the decomposition point of the ester. We have found, contrary to what would be expected, that if the plasticizer is incorporated in the ester at a relatively low temperature and the plasticized material then directly extruded, the temperature of the extrusion operation may be kept definitely below the decomposition temperature, thus avoiding discoloration, unevenness, blotchiness, and other defects in the product.

Our process is extremely simple and involves only two principal steps as above set forth—plasticizing at low temperature and direct molding—and is particularly characterized by the fact that no heat treatment of any kind, between the incorporation of the plasticizer and the molding steps, as by working on hot rolls, is required.

In the following examples and description we have set forth several of the preferred embodiments of our invention, but they are included merely for purposes of illustration and not as a limitation thereof.

Our invention may be conveniently illustrated by reference to a typical extrusion molding operation, a suitable apparatus for carrying out such an operation being shown in Fig. 1 of the drawing.

The first step in our invention is to incorporate the plasticizer with the cellulose organic acid ester material in general accordance with the method disclosed in the copending application of Spencer E. Palmer, Serial No. 70,201, filed of even date herewith. The plasticizers employed for our process are the solvent plasticizers, that is, those which have a rather drastic solvent action upon the ester material at ordinary or elevated temperatures. In fact, it is one of the features of our invention that we are enabled to use plasticizers of this character which have heretofore been ruled out because of the fact that due to their excessive local solvent action on the cellulose derivative particles, a blotchy, uneven, non-homogeneous product resulted when such compositions were subject to the usual plasticizing and molding operations of the prior art.

The plasticizer is first cooled or refrigerated to a temperature below which it attacks, or exerts any appreciable or drastic solvent action on, the particular cellulose organic acid ester to be employed in the process. The cellulose derivative material, such as cellulose acetate, ground to a suitable particle size, say of the order of 80 mesh, is added to the refrigerated plasticizer in a mixing vessel provided with means for mechanically mixing the material and consequently exposing new surfaces thereof to the action of the plasticizer. This vessel is provided with cooling means which keep the temperature of the mix definitely below the temperature at which the plasticizer has an appreciable or drastic solvent action on the ester.

The material, after mixing for a sufficient period to thoroughly incorporate the plasticizer, is fed directly and without any further mechanical or heat treatment such as kneading, rolling or the like to a molding device, such as an extruder, where it is subjected to a mildly elevated temperature definitely below the decomposition point of the cellulose derivative material, which consolidates the material and brings it into the state of a thoroughly plasticized continuous molding mass. The material is then extruded in the form of sheets, tubes, rods and the like and is thereafter subjected to any desired further operations such as pressing, calendering, or similar treatment.

Our invention will be more readily understood by reference to the accompanying drawing in which one type of device suitable for carrying out our process is illustrated and in which.

Figure 1:
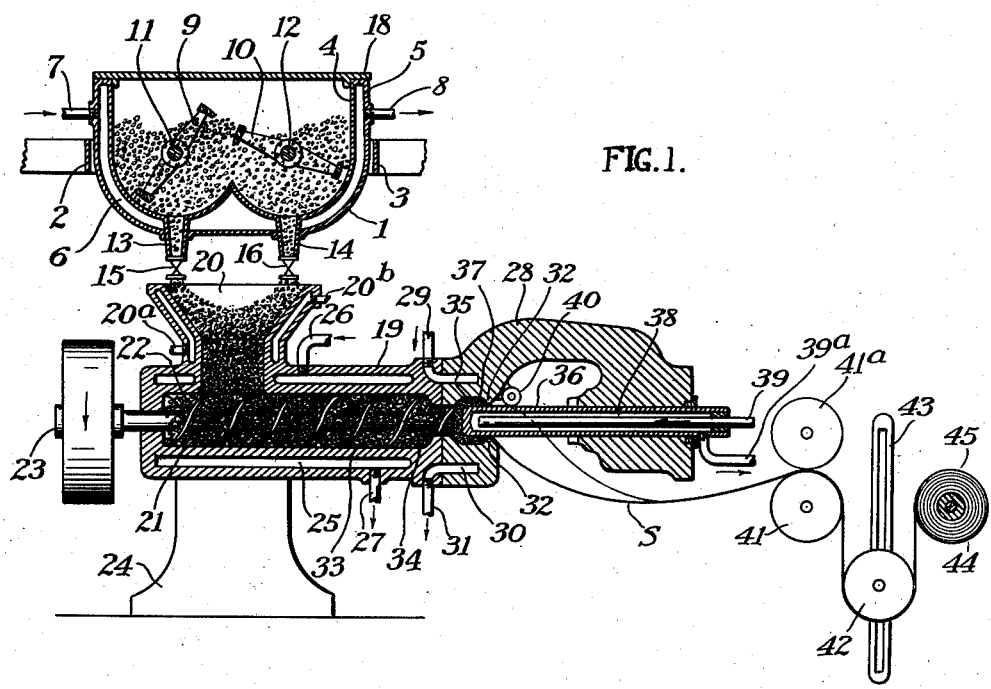
Fig. 1 is a diagrammatic elevation view in partial section of a screw-stuffing device and its associated plastic mixing and feeding mechanism and also mechanism for handling the product produced in the process.

The numeral 1 designates a more or less conventional type of mixing vessel which may be suitably supported by means of brackets 2 and 3. The vessel comprises inner and outer walls 4 and 5, respectively, which are spaced apart to provide a water jacket 6 for the circulation therethrough of a cooling fluid which may be water, a brine solution or other refrigerant, the fluid being fed to the device through inlet conduit 7 and passing therefrom on the opposite side of the jacket through outlet conduit 8. The numerals 9 and 10 designate rotary mixing devices of a conventional form mounted on shafts 11 and 12 suitably driven by a source of power (not shown).

As shown, the mixer 1 has an upstanding portion which divides it roughly into two compartments. These compartments are adapted to feed material from the mixer through delivery conduits 13 and 14, provided with valved outlets 15 and 16 which control the flow of the material into the extruding device 19 conveniently located directly below the mixer. The mixer is preferably provided with a cover 18 for the purpose of preventing contamination of the mix and for enabling a more exact control of the mixing temperature.

Numeral 19 indicates one form of extruding device which may be used in practicing our invention. This comprises a cylindrical screw-stuffer provided with a jacketed hopper 20 for supplying plasticized composition to stuffing chamber 21, from which the material is forced by means of stuffing screw 22, mounted on shaft 23, driven by an appropriate source of power (not shown). The jacket of the hopper is supplied with a cooling fluid such as cold water, by means of inlet conduit 20a, the fluid leaving the jacket by means of outlet conduit 20b. The device is conveniently mounted upon base 24 and is provided with an internal heating chamber 25 supplied by a liquid such as hot oil or superheated steam through inlet 26, the heating fluid leaving the device by means of outlet conduit 27.

The device is provided with a conventional type of extrusion head 28, equipped with means for internal circulation, of a heating fluid such as oil, the heating fluid being conveyed into the head via inlet conduit 29, passage 30, leaving by means of conduit 31. The extrusion head is also provided with sheet-forming lips 32.

The extrusion head 28 is positioned with respect to the screw-stuffing chamber 33 in such manner that the orifice 34 leading from the stuffing chamber is in register with the extrusion orifice 35 located in the extrusion head. The head is also provided with a hollow cylindrical mandrel 36 which projects well into the extrusion orifice 35 but is of insufficient diameter to completely close the extrusion orifice, leaving a circular opening 37 for passage of the extruded material. Mandrel 36 is provided with an internal heating chamber 38, which is supplied with hot water or other fluid by means of inlet conduit 39, the water being conveyed away from the device by conduit 39a.

Mounted above mandrel 36 and in close proximity to the extrusion orifice is the rotary disc cutter 40 which operates to split the tube formed in the extrusion operation and lay it open in the form of a sheet S. The sheet S, after it is laid open may pass over a calender roll 41, a constant tension roll 42, guided by vertical guide bar or slide 43, and thence to windup roll 44, which is driven by means of a pulley 45 from a source of power (not shown).

Figure 2:
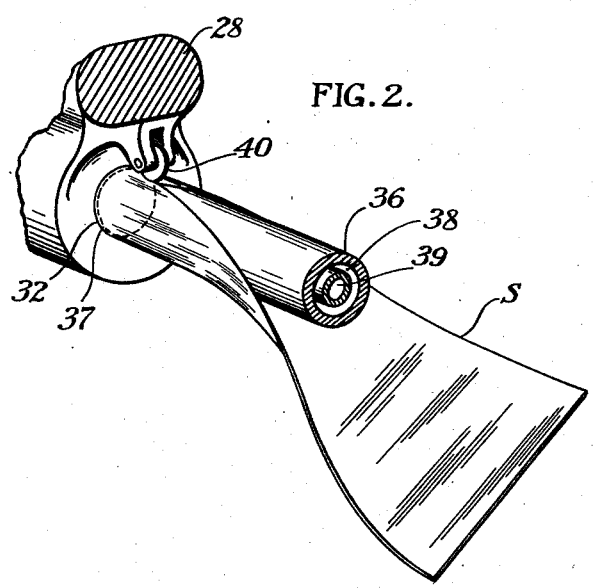
Fig. 2 is a fragmentary perspective view in partial section showing the manner of forming a sheet in accordance with the invention.

Referring to Fig. 2 the numeral 28 indicates a portion of the lower part of the extrusion head and illustrates the manner in which the material is extruded, first in the form of a tube, and then split into the form of a sheet by means of cutter 40.

Inasmuch as the mechanism illustrated for carrying out our process is more or less conventional, no extensive discussion of its operation is necessary. It is desirable, however, to describe the general steps of the process which constitute our invention. The cellulose organic acid ester material, for example, finely divided cellulose acetate ground to a particle size of about 80 mesh, is added to a body of liquid or semi-liquid plasticizer such as dimethyl phthalate in the mixing chamber of the mixing device 1, the plasticizer having been cooled to a temperature of between 0° and 15° C., by circulation of water through the jacket of the mixing device. The mixing operation is carried out in the conventional manner by operating the rotary mixing devices 9 and 10 for a period of 30 minutes after which the plasticized material is fed through the outlet conduits 13 and 14 into the hopper 20 of the screw stuffing device. As previously indicated, the hopper 20 is jacketed and a cooling medium circulated therethrough to keep the material cool, or at least moderately cool, until it leaves the throat of the hopper. Upon passing downwardly, the material gradually encounters an increasing temperature until it finally emerges into the stuffing chamber 21 where it encounters a moderately elevated temperature of the order of 200° C. which is maintained throughout the length of the extrusion chamber. If desired, the material may be fed from the hopper to the stuffing chamber by means of a rotary variable speed valve of well-known construction or by a screw-type conveyor positioned between the throat of the hopper and the stuffing chamber, or by both such valve and conveyor. Furthermore, provision may be made for a definite step-wise transition in the temperature of the material by providing that portion of the feeding mechanism between the hopper and the stuffing chamber with an intermediate heating jacket and circulating therethrough water, oil, or other fluid maintained at a temperature intermediate that circulated in the hopper and the stuffing chamber jacket.

In accordance with our process, the material is also preferably extruded at about the same temperature as that prevailing in the stuffing chamber. The material passes through the extrusion orifice 34 into the extrusion chamber 35, past the sheet-forming lips 32, from which it emerges in the form of a plastic tube which is thereupon split and laid open into the form of a sheet by means of a rotary slitter 40.

The sheet-forming operation is also more clearly illustrated in Fig. 2. It will be seen that the material emerges from the extrusion sheet-forming lips 32 in the form of a plastic tube and this is almost immediately split by the slitter, the edges of the sheet thus formed dropping away from both sides of the mandrel 36 and thus being laid more or less flat as it passes to any desired mechanical or other finishing operation. It may, for example, be desired to calender the sheet or perform some other operation thereon to give it varying appearance or otherwise change its characteristics. A calendering mechanism is shown at the extreme right of Fig. 1, the function of which has been referred to above.

While we have found it convenient to illustrate our invention by reference to a specific form of molding operation, it is to be understood that our invention is not limited to this particular type of process, since in its broader aspects, it comprises the combination of cold mixing and direct molding, whether carried out by the extrusion, injection or open molding methods. It will of course be apparent that the plasticized cellulose organic acid ester material may be employed successfully in accordance with our invention in the operation of such well known injection molding devices as the Isoma, Eckert-Zeigler and others, since, due to the thorough plasticizing step, it is equally susceptible of use in this type of apparatus.

A rather wide range of cellulose organic acid esters may be successfully employed in our process. Although we prefer to use an ester, such as cellulose acetate, our process is also applicable to other cellulose organic acid esters adapted for use in molding operations, such as cellulose propionate, cellulose butyrate and mixed esters such as cellulose acetate propionate and the like. Of these materials the hydrolyzed or partially hydrolized esters, due to the fact that they are relatively inherently more plastic than the unhydrolyzed esters, are peculiarly well adapted for use in our process since they are susceptible of being worked and molded at relatively moderate temperatures.

Likewise, while we have chosen to illustrate our invention by reference to the use of a specific plasticizer such as dimethyl phthalate, our invention makes possible the use of any of those plasticizers which at ordinary temperatures have a rather pronounced solvent action upon the cellulose organic acid esters. Of course, the temperature at which a given plasticizer becomes actively solvent, varies both with the plasticizer and with the ester itself. With certain of the plasticizers for cellulose acetate, there appears to be a critical temperature above which the plasticizer becomes a rather drastic solvent. A table is given below listing some of the best solvent plasticizers for cellulose acetate and showing the approximate critical temperature for each:

| Plasticizer | Max. temp. °C. |
| --- | --- |
| Benzyl lactate | 15 |
| Triacetin | 8 |
| Ethylene glycol diacetate | 4 |
| Diethylene glycol diacetate | 7 |
| Triethylene glycol diacetate | 8 |
| Ethylene glycol dipropionate | 15 |
| Glyceryl chloro dipropionate | 15 |

It will also be evident that the temperature of the mixing step may vary rather widely with the particular cellulose ester in question and with the particular plasticizer employed. In general, it may be said that in any event the temperature of mixing should be kept below that at which the plasticizer becomes an active solvent. It will be evident that this temperature should, as a practical matter, generally be above the melting point of the plasticizer in order that the plasticizer may be incorporated with the plastic material in a liquid or semi-liquid form.

Likewise, the temperatures of extrusion may vary considerably, depending upon the particular cellulose ester and plasticizer employed in the plastic composition.

Although we have described our invention by reference to a process in which the cold-plasticized cellulose organic acid ester material is admitted directly to the extrusion or other type of molding device, it is not critical that the plasticized mass be molded immediately after the plasticizing operation. Once the plasticizer is incorporated by the cold mixing method, the material may be subsequently allowed to come to atmospheric temperature and even stored in suitable containers for future use. In this connection we wish to point out that the terms "direct molding" or "direct extrusion" as used herein refer to processes in which no hot rolling or kneading or other heat treatment of the plastic material precedes the molding step.

As indicated above, our process is broadly applicable to the manufacture of plastic products by the extrusion, injection molding or open molding methods. One of the outstanding features of the process is the fact that all hot rolling or kneading operations are avoided. In accordance with the invention, all that is necessary is merely to thoroughly mix the plasticizer with the cellulose organic acid ester material at a low, or relatively low, temperature and then directly mold the plasticized mass. By operating in accordance with this procedure, we are enabled, not only to use the solvent plasticizers which have hitherto been considered entirely unsuitable for molding processes, but also are enabled to carry out the actual molding operation, whether by extrusion or otherwise, at temperatures which are definitely below the decomposition point of the cellulose ester in question. For example, in the extrusion molding of cellulose acetate in accordance with our invention the extrusion temperature may be kept down to, or below, 200° C., whereas in accordance with prior art practice involving the use of non-solvent plasticizers, the required temperature often runs as high as 280°–300° C., which often gives rise to decomposition and discoloration of the plastic.

By our process we are enabled to obtain a clear uniformly and homogeneously plasticized product free from all blotchiness, discoloration, unevenness, or other defects.

What we claim is:

1. The process of forming plastic products which comprises incorporating dimethyl phthalate with finely divided cellulose acetate at a temperature of 0° C. to 15° C. and then directly extruding the plasticizer material at a temperature of not over about 200° C.

2. The process of forming plastic products which comprises incorporating dimethyl phthalate with finely divided cellulose acetate at a temperature of 0° C. to 15° C. and then directly molding the plastic material at a temperature of not over 200° C.

JOHN S. KIMBLE.
SPENCER E. PALMER.